United States Patent [19]

Schaefer

[11] 4,229,112
[45] Oct. 21, 1980

[54] RANDOM STUFFER RIBBON CARTRIDGE WITH IMPROVED RIBBON EXIT CONTROL

[75] Inventor: John O. Schaefer, Lexington, Ky.

[73] Assignee: International Business Machines Corporation, Armonk, N.Y.

[21] Appl. No.: 972,596

[22] Filed: Dec. 22, 1978

[51] Int. Cl.³ ............................................. B41J 33/10
[52] U.S. Cl. .................................. 400/196.1; 400/248
[58] Field of Search ............ 400/194, 195, 196, 196.1, 400/248

[56] References Cited

U.S. PATENT DOCUMENTS

| | | | |
|---|---|---|---|
| 3,814,231 | 6/1974 | Cappotto | 400/196.1 |
| 3,863,749 | 2/1975 | Perry et al. | 400/196.1 X |
| 3,989,132 | 11/1976 | Carson | 400/196.1 X |
| 4,053,042 | 10/1977 | Hess | 400/196 |

FOREIGN PATENT DOCUMENTS

| | | | |
|---|---|---|---|
| 2412762 | 11/1974 | Fed. Rep. of Germany | 400/196.1 |
| 2551989 | 5/1976 | Fed. Rep. of Germany | 400/196.1 |
| 2534535 | 2/1977 | Fed. Rep. of Germany | 400/196.1 |
| 1218146 | 12/1959 | France | 400/196.1 |

OTHER PUBLICATIONS

IBM Technical Disclosure Bulletin, "Ribbon Cartridge Exit Impedance," Dowd, vol. 20, No. 11B, Apr. 1978, pp. 4739-4740.

*Primary Examiner*—Ernest T. Wright, Jr.
*Attorney, Agent, or Firm*—Laurence R. Letson

[57] ABSTRACT

A ribbon exit control, for a random stuffing ribbon cartridge is disclosed which prevents the accidental jamming of the ribbon at the exit port of the storage chamber. The exit port is formed by two mating members whose surfaces are configured, when mated, to form a slot of curvelinear shape such as the form of an arc of a circle or an angled relatively flat lazy V shape. An alternate form is a slot punched in a one piece member to define the slot. The deformation of the slot from that of a straight line causes the ribbon to buckle as it is pulled from the storage chamber and to assume a cross-section other than that of a straight line. This acts to separate the ribbon strand being removed from the chamber, from any other adjacent folds of the ribbon. Since the ribbon strand and the adjacent folds are separated by the deforming of the ribbon it is more difficult for an adjacent fold to be pulled into the exit gate thereby causing a jam. The width of the slot is controlled by width control fingers extending across the end of the slot to an abutment surface. The uniform slot width improves reliability and the width control fingers further act as top and bottom constraints preventing the ribbon from pulling out of the slot and circumventing the exit port. The fingers also regulate not only the slot width but also the uniformity of the slot width top to bottom.

3 Claims, 6 Drawing Figures

RANDOM STUFFER RIBBON CARTRIDGE WITH IMPROVED RIBBON EXIT CONTROL

BACKGROUND OF THE INVENTION

In random stuffer box ribbon catridges the ribbon is forced by a stuffer or feed mechanism into a storage chamber where it forms random loops. The ribbon is pulled from the feed chamber on the opposite side and fed back to the stuffing mechanism to form a closed loop. The stuffing of the ribbon is essentially random and unpredictable.

One problem associated with this unpredictability is that some ribbon loops will tend to pack and others will be loose in the cartridge and that it is possible for loops of a ribbon adjacent the strand of ribbon being pulled from the storage chamber, to be pulled into the exit port or exit pinch point. When this occurs several things can happen. If the loop is fully pulled into a second chamber and then is allowed to feed out across the print point, nothing diastrous will occur. However, if a particular loop or loops trapped at the exit port is of sufficient volume that it cannot be pulled into a second chamber in its totality, the effect will be a jam which will ultimately result in failure of the cartridge and require its replacement or its disassembly. Disassembly may result in a long length of randomly stuffed ribbon being released and potentially allowed to fall out of the cartridge thus rendering the ribbon and cartridge useless.

The frictional coefficient between adjacent ribbon strands, when trapped in a constricted space, is sufficiently high that it is not possible to continue to feed the ribbon from the main storage chamber until such time as the trapped loop is consumed in the normal course of feeding.

The failures presented by jamming of the ribbon folds in the exit port are random in nature and therefore can occur on a relatively new ribbon and cartridge every bit as easily as a failure on a ribbon where the useful life of the ribbon has been substantially consumed.

Prior Art

In an effort to prevent the malfeeding such as described above, numerous efforts have been made to either prevent the entry of multiple loops into the exit port or if multiple loops enter the exit port to allow them to pull through into a secondary chamber where the ribbon can then be fed on to the point of use after the jam has been eliminated by pulling the entire jamming portion of the ribbon into the secondary chamber. An example of this type cartridge is shown in U.S. Pat. No. 4,053,042 to Hess. Typically, the ribbon is pulled between a spring member and a member forming a part of the wall of the storage chamber. An alternative approach is to feed the ribbon through a series of resilient drag members to peal back the ribbon feed folds and allow only the single strand to exit from the cartridge. An example of this approach may be found in U.S. Pat. No. 3,863,749. Both of these techniques will fail to solve the jamming problem if a sufficiently large fold or sufficiently large portion of ribbon is trapped in the exit port.

An alternative approach to the problem may be found in U.S. Pat. No. 3,989,132 wherein restricter ridges restrain the main body of the stored ribbon allowing an open area at the end of the cartridge to accept multiple folds of the ribbon to allow expansion and unfolding as the ribbon is fed outward from the storage chamber. In this particular device there is a single restraining pinch point to restrain the ribbon and reliance is placed solely upon the ability of the ribbon to unfold in the expansion region.

A further alternative approach to the solution of jamming problems is illustrated in IMB Technical Disclosure Bulletin, Vol. 20, No. 11B, April, 1978, pages 4739 and 4740. The upper and lower walls of the cartridge are constructed to form a constricted path which causes deflection of the ribbon such that it is pulled through a narrowed impedance to prevent jamming.

OBJECTS OF THE INVENTION

It is an object of the invention to retain all folds and portions of the stored ribbon of an endless loop type in the storage chamber of a random stuffer box cartridge except that strand being actively withdrawn from the storage chamber.

It is a further object of the invention to prevent jamming of the exit port of a ribbon cartridge.

It is still an additional object of the invention to strip adjacent ribbon folds from the strand of ribbon being removed from the chamber.

These objects of the invention are accomplished and the shortcomings of the prior art overcome by the forming, of an exit port or slot which causes the ribbon to be deviated from a planar form as it passes through the exit port and out of the storage chamber. This is accomplished by forming into the walls of the storage chamber restraining members which, when mating with each other form a slot aperture of uniform width through which the ribbon strand may pass upon leaving the storage chamber. Alternatively a uniform width slot may be formed in a single member. The configuration of the slot formed by the slot forming members is such that the cross-section of the ribbon is deviated from that of a straight line so that the ribbon cannot leave the chamber in a planar path but must be bowed or buckled to pass through the exit port. The buckling of the ribbon must be sufficient that the slot forming members will catch and arrest adjacent ribbon folds as the ribbon strand is removed from the storage chamber. The bowing or buckling of the ribbon will act to push the adjacent ribbon folds away from the slot in at least one region such that the slot forming members will have an opportunity to catch or arrest the folds and prevent them from jamming the exit slot. The slot forming members are configured such that when engaged with each other they define a curved or angled aperture through which the ribbon may pass, which has a uniform gap width throughout its length. The gap is defined by a spring biasing of the slot forming members into engagement with each other to insure that the gap width control is consistent.

The invention may be more fully understood in detail by reference to the drawing and detailed description to follow.

DRAWING

FIG. 1 is a top view of the cartridge with portions of the top wall or plate removed.

FIGS. 2 and 3 illustrate differing slot forming members which define arcuate and lazy V shaped exit slots along section lines 2—2 and 3—3 in FIG. 1.

DETAILED DESCRIPTION

Figure 1:
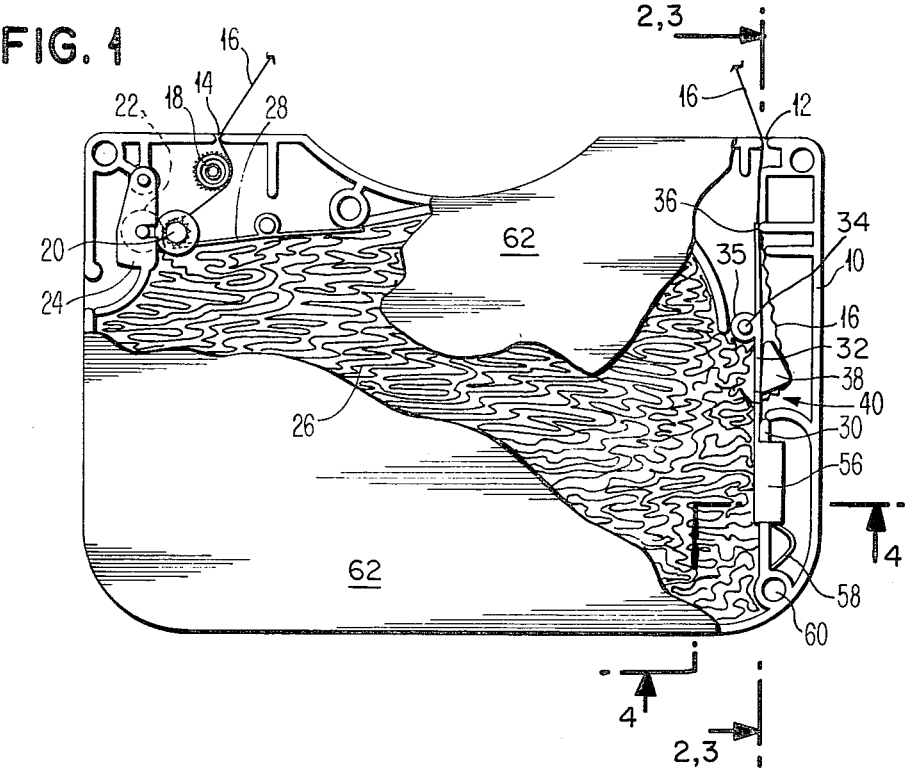

To contain the ribbon 16 and provide a storage facility therefore, a cartridge 10 is provided. Generally box-like in shape, the cartridge 10 has provided in the outer walls thereof aperture 12 to allow ribbon 16 to exit the confines of the cartridge 10 for use with a printer. Aperture 14 is provided so that ribbon 16 may be retrieved and returned to the cartridge 10 for storage and recirculation. Ribbon 16 may be passed about an idler spool 18 to provide an adequate amount of wrap around pinch roll 20. Pinch roll 20 is provided with a serrated surface which will then engage pinch roll 22. Pinch roll 20 may be manually driven from outside the cartridge 10 in a conventional manner. Pinch roll 22 is carried by biasing bracket 24 thereby engaging its surface against the ribbon 16 and surface of pinch roll 20.

When pinch roll 20 is driven in a counterclockwise direction ribbon 16 will be pulled into the cartridge 10 and fed into chamber 26. The ribbon 16 is stripped from pinch roll 20 by stripper baffle 28. Stripper baffle 28 further provides a portion of the wall of storage chamber 26.

Cartridge 10 is provided with a secondary wall 30. This wall 30 forms a portion of the confining wall of the storage chamber 26. To complete the wall of the storage chamber 26 a baffle 32 is mounted by slipping an annulus 35 formed therein over a post 34. The baffle 32 engages surface 36 which may be a portion of a wall or may be the end of a wall or rib member, to provide a frictional pinch point therebetween. The frictional pinch point will provide a drag to insure that the ribbon 16 is held in a tight span under tension provided by the pinch rolls 20, 22.

Figure 2:
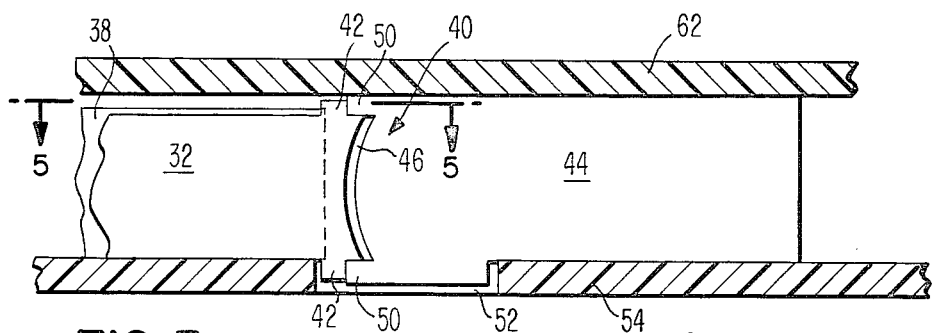
Figure 3:
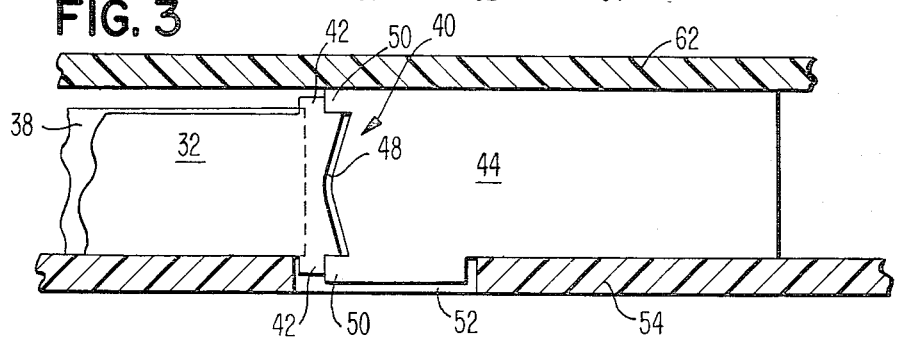
Figure 4:
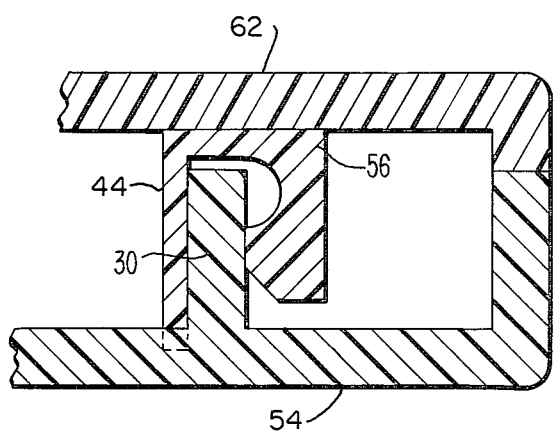
FIG. 4 is a section view of the storage chamber wall and one of the slot forming members carried thereby along section line 4—4 of FIG. 1.

In order to provide the pinching force between baffle 32 and surface 36, baffle 32 is caused to flex by supporting the opposite end thereof against block 38. Block 38 provides a dual function of supporting the otherwise free end of baffle 32 and providing an equivalent of a post around which ribbon 16 is withdrawn. This directs the path of ribbon 16 outward from the exit port 40 to cause forces on the ribbon 16 to be a substantially straight pulling force with respect to the exit port 40. Referring to FIGS. 2 and 3, which are section views of the cartridge 10 illustrated in FIG. 1, the exit port 40 configuration is more clearly viewable. Baffle 32 is provided with abutments 42 top and bottom. These abutments 42 serve a dual purpose in that they co-act with slot forming member 44 to prevent the excessive closure of the exit slot 46, 48. Slot forming member 44 is provided with gap width control fingers 50 which engage abutments 42. The length of fingers 50 effectively controls the widths of slot 46 and slot 48 and insures the uniformity of the slot width. FIG. 2 illustrates slot 46 in an arcuate form while FIG. 3 illustrates slot 48 in a shallow lazy V configuration. Both slots 46, 48 act to deviate the path of the ribbon 16 passing therethrough from that of a straight line cross-section or planar exit form. The abutment 42 on the lower side of a cartridge 10 together with lower finger 50 are positioned in a slot recess 52 in the lower wall or floor 54 of the cartridge 10. This arrangement of abutments 42 and finger 50 acts to further stabilize the slot forming members 32, 44. Slot forming member 44 is further provided with a U shaped channel portion 56 to slidably fit over and receive storage chamber wall portion 30. This provides a rigid lateral support while permitting sliding of channel portion 56 and slot defining member 44 along the wall 30.

To insure that fingers 50 engage abutments 42 thereby defining the desired slot 46 and 48, buckled leaf spring 58 is wedged between channel portion 56 and a portion of the cartridge shell 10. Illustrated in FIG. 1 is an aperture 60 for receiving a complimentary mating pin (not shown) on cover 62 for use in assembly of the cartridge 10. The structure of the cartridge 10 providing apertures 60 provides a convenient point for lodging one end of leaf spring 58. Leaf spring 58 could equally as well be blocked by any other conventional technique. Where the path of the ribbon 16 bends after exiting from slot 46 or slot 48, the slots 46, 48 should preferrably be oriented so that the ribbon 16 is pulled into the depth of the slot 46 or 48 as opposed to being pulled onto the crown. This arrangement is illustrated in FIGS. 2 and 3 when related to FIG. 1 and the path of ribbon 16 past the pinch point defined by baffle 32 and surface 36.

As ribbon 16 is withdrawn from the cartridge 10, the tension on ribbon 16 created by pinch rolls 20, 22 will cause the ribbon 16 to be extracted from the storage chamber 26 through exit port 40. Exit port 40 may be configured as an arcuate exit slot 46 or a shallow V shaped slot 48 as illustrated in FIGS. 2 and 3 respectively. As the ribbon 16 is pulled through these slots 46, 48 the cross-section of the ribbon 16 is caused to deviate from that of a straight line into a configuration of an arcuate bow or a deflection into a shallow lazy V shaped trough.

Figure 5:
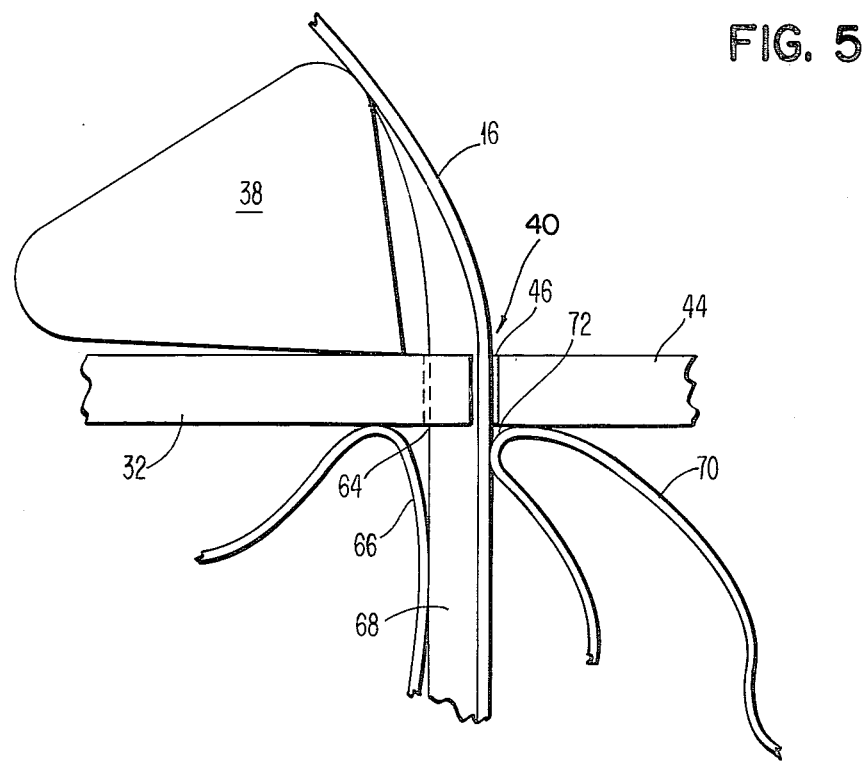
FIG. 5 is a section view of the slot forming member with a ribbon strand passing therethrough and having adjacent ribbon folds illustrated along section line 5—5 in FIG. 2.

A more detailed view of the effect that the bowing will have on separating adjacent folds can be seen in FIG. 5 where ribbon 16 is illustrated exiting through slot 46 defined by slot forming member 44 and baffle 32. The section illustrated in FIG. 5 is taken at or near the top surface of baffle 32 and shows the extent of deflecting of the bowing of ribbon 16 at point 64. Ribbon loop 66 is shown adjacent the bowed or buckled portion 68 of ribbon 16 within the chamber 26 while ribbon loop 70 is illustrated as being pulled toward exit slot 46 but not allowed to enter because it will only align with exit slot 46 at one point 72 and cannot align itself with portions of the bowed or buckled portion of the slot 46 extending over to point 64.

Although most fabric ribbons are relatively uniform in thickness, variations do occur and may occur asymetrically along the axis of the ribbon. In order to overcome any effects such asymetrical variation may cause, fingers 50 in addition to performing a slot width control function in cooperation with abutments 42, further provide constraints to prevent the ribbon 16 from being pulled either upward or downward out of the slots 46, 48.

Figure 6:
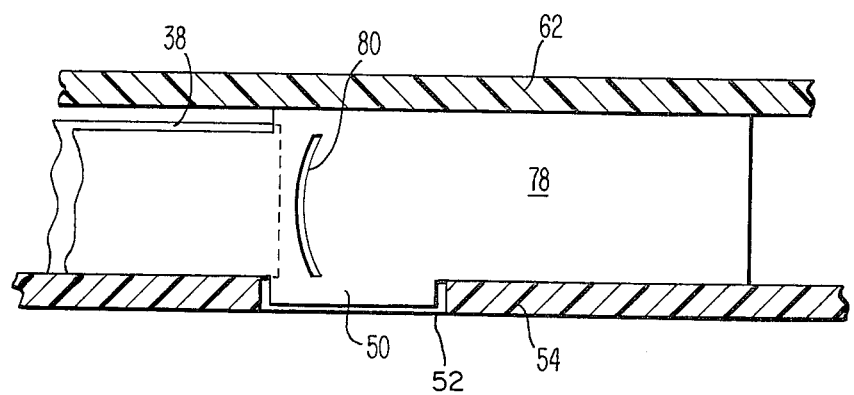
FIG. 6 is an alternate design with the slot formed in a unitary wall member.

Referring to FIG. 6, a unitary wall member 78 is illustrated with the slot 80 of uniform width pierced or formed therein by conventional techniques. This type slot 80 will necessitate the threading of the ribbon 16 strand through the slot 80 prior to joining the ends to form the endless loop.

Although this description has been made with respect to a relatively narrow width ribbon it should be understood by one skilled in the art that this improvement to random storage stuffer boxes may be implemented on any random stuffer ribbon box which requires that the ribbon be removed from a storage chamber and then subsequently fed through the ribbon mechanism. Because of the enhanced jam prevention provided by this improvement, it is not necessary to have as large a secondary chamber into which any additional folds may be pulled and thus provides the capability to increase the size of the storage chamber of the cartridge without having to increase the cartridge size.

What is claimed is:

1. In a stuffer type ribbon box having top, bottom, and side walls joined to form a cartridge, an endless ribbon loop, further comprising ribbon pulling and stuffing means, box wall means defining a storage chamber, entrance and exit ports from said cartridge; and means for regulaing the removal of said ribbon from said chamber; said means for regulating further comprising, slot means for the passage of said ribbon therethrough, said slot means comprising two slot forming members, said slot forming members matingly comprising stop surfaces engageable with each other to regulate the width of said slot means, said stop surfaces supported by said slot forming members wherein said slot forming members support said surfaces and further define upper and lower constraints for the end of said slot means;

resilient means biasing at least one of said members toward the other of said members;

said slot forming members defining a slot means having a shape deviating from a plane sufficient to cause said ribbon to buckle out of a plane, thereby causing the adjacent ribbon folds to be moved away from said slot means thereby preventing jamming.

2. The ribbon cartridge of claim 1 wherein said shape defined by said slot forming members is that of an arc of a circle.

3. The ribbon cartridge of claim 1 wherein said shape defined by said slot forming members is curvelinear.

* * * * *